United States Patent
Xu et al.

(10) Patent No.: US 7,408,297 B2
(45) Date of Patent: Aug. 5, 2008

(54) LIGHT-EMITTING DEVICE, DISPLAY DEVICE, AND STRESS SENSOR

(75) Inventors: Chao-Nan Xu, Shukumachi Tosu Saga (JP); Hiroshi Tateyama, Shukumachi Tosu Saga (JP)

(73) Assignees: Japan Science and Technology Agency, Saitama (JP); National Institute of Advanced Industrial Science and Technology, Tokyo (JP)

( * ) Notice: Subject to any disclaimer, the term of this patent is extended or adjusted under 35 U.S.C. 154(b) by 486 days.

(21) Appl. No.: 10/508,035

(22) PCT Filed: Mar. 18, 2003

(86) PCT No.: PCT/JP03/03230

§ 371 (c)(1),
(2), (4) Date: Sep. 16, 2004

(87) PCT Pub. No.: WO03/078889

PCT Pub. Date: Sep. 25, 2003

(65) Prior Publication Data

US 2005/0168139 A1 Aug. 4, 2005

(30) Foreign Application Priority Data

Mar. 18, 2002 (JP) ............................. 2002-074978

(51) Int. Cl.
*H05B 33/00* (2006.01)
*H05B 33/22* (2006.01)
(52) U.S. Cl. ........................................ 313/508; 313/509
(58) Field of Classification Search .......... 313/503–509

See application file for complete search history.

(56) References Cited

U.S. PATENT DOCUMENTS 3,626,240 A * 12/1971 MacIntyre ................... 315/149
6,280,655 B1   8/2001 Xu et al.

FOREIGN PATENT DOCUMENTS

| JP | 56-136874    | 10/1981 |
| JP | 10-189244    | 7/1998  |
| JP | 2000-173301  | 6/2000  |
| JP | 2001-030493  | 2/2001  |
| JP | 2001-049251  | 2/2001  |
| JP | 2001-352101  | 12/2001 |
| JP | 2003-253261  | 9/2003  |

OTHER PUBLICATIONS

Notice of Reasons for Refusal dated May 27, 2008 in corresponding Japanese Patent Application No. 2003-576861 (with full English translation).

* cited by examiner

*Primary Examiner*—Karabi Guharay
(74) *Attorney, Agent, or Firm*—Harness, Dickey & Pierce, P.L.C.

(57) ABSTRACT

A stacked structure (1) includes an electrostriction layer (2) including an electric inductive distortion material and a stress light-emitting layer (3) including a stress light-emitting material. When applying a voltage to the electrostriction layer (2) in the stacked structure (1), the electric inductive distortion material deforms, thereby the electrostriction layer (2) deforms. The deformation of the electrostriction layer (2) causes an external force to act on the stress light-emitting material of the stress light-emitting layer (3), and the stress light-emitting layer (3) emits light, accordingly. That is, by applying the voltage to the stacked structure (1), the stacked structure (1) can emit the light.

9 Claims, 6 Drawing Sheets

LIGHT-EMITTING DEVICE, DISPLAY DEVICE, AND STRESS SENSOR

This application is a 371 of PCT international application Ser. No. PCT/JP03/03230, filed on Mar. 18, 2003.

TECHNICAL FIELD

The present invention relates to a novel light-emitting device, a display device, and a stress sensor, which emit light in response to a deformation due to an externally applied voltage.

BACKGROUND ART

Conventionally used as a typical light-emitting device are a light emitting diode (LED), a vacuum fluorescent display (VFD), a fluorescent lamp, an incandescent lamp, or the like.

In a field of a display using LED (serving as the light-emitting device), an LED which emits blue light has been developed. Since red, green, and blue LEDs have been lined up, it is possible to carry out a full-color display. Thousands of three-color LEDs are provided in most of existing supersized full-color screens.

In addition, used as another existing displays are a CRT (Cathode-Ray Tube) display, a plasma display, a liquid crystal display, or the like.

The CRT display usually has three electron guns built-in. Three electron beams shot by the three electron guns are directed to a face glass of the display, and causes fluorescent materials, which are applied on a back surface of the face glass, to emit light. This allows the CRT display to carry out an image display. Moreover, basically, each pixel in the plasma display is partitioned by partition walls. Mercury argon gas, xenon gas, or the like is sealed within each partitioned pixel. That is, it is possible to say that thousands of extremely small fluorescent tubes are provided within a panel of the plasma display.

The liquid crystal display is basically arranged so as to include two glass plates, and a liquid crystal layer provided between the two glass plates. The liquid crystal layer is made by pouring liquid crystal in a gap between the two glass plates. The liquid crystal display carries out the image display by applying a voltage across the liquid crystal layer sandwiched between the two glass plates so that transmittance of the liquid crystal layer is controlled.

By the way, conventionally, a strain gage is mainly used as a stress sensor which measures stress exerted on architectural structures, or the like. The strain gage measures the strain by utilizing a physical phenomenon in which a resistance value of an electric resistor changes in response to the strain applied to the electric resistor.

However, the conventional light-emitting devices such as the fluorescent lamp, the vacuum fluorescent display, or the incandescent lamp respectively have the following problems.

That is, since the fluorescent lamp uses mercury, it is impossible to avoid environmental problems. Moreover, the vacuum fluorescent display has a triode vacuum tube structure composed of a positive electrode, negative electrode, and a grid, thereby giving rise to the complexity of the structure. Furthermore, since the incandescent lamp emits the light based on a heat emission obtained by heating up a filament in a glass bulb, the incandescent lamp has a short life span and has low crashworthiness.

The displays using the conventional light-emitting device have the following problems.

Namely, in the case where the LED is used as the light-emitting source of the full-color screen, the image display on the screen is carried out by thousands of dot emissions. That is, the image displayed on the screen is an aggregate of light-emitting dots. As such, it is difficult to improve a quality of the image displayed.

Moreover, since the CRT display structurally requires a glass tube hermetically sealed under high vacuum, it is complex in structure, it becomes large in volume, and it is impossible to save weight. In addition, another problems arise that the crashworthiness is low and there is a high possibility that the CRT display is destroyed by heat.

Furthermore, some plasma display uses mercury gas, thereby giving rise to a problem relating to environmental protection. Moreover, since the liquid crystal display uses the fluorescent tube as the light-emitting source, it has a problem relating to environmental protection like the plasma display does.

Moreover, the strain gage serving as a conventional stress sensor has the following problem. That is, a single strain gage can measure the stress only at a specific point of measuring object. In order to measure a stress distribution state of the measuring object, a plurality of strain gages are required. This is the problem which the strain gage has.

By the way, Japanese unexamined patent publication No. 49251/2001 (Tokukai 2001-49251, published on Feb. 20, 2001) has proposed a novel stress light-emitting material which emits the light in response to a deformation due to mechanically applied external force. The present inventors have attempted to utilize the stress light-emitting material to solve the conventional problems.

DISCLOSURE OF INVENTION

The present invention was made in view of the foregoing conventional problems, and an object of the present invention is to provide a light-emitting device which is pollution-free, longer lasting, easy to produce, simple in structure, and strong. Moreover, another object of the present invention is to provide a display device which has a high image quality, high crashworthy and high heat resistance, and is pollution-free. Furthermore, a further object of the present invention is to provide a stress sensor which can easily measure a stress distribution state of measuring object.

To solve the above problems, a light-emitting device of the present invention includes (i) an electrostriction section including an electric inductive distortion material which deforms in response to an applied voltage, and (ii) a stress light-emitting section including a stress light-emitting material which emits light in response to externally applied force.

With the arrangement, since the electrostriction section includes the electric inductive distortion material, the electrostriction section deforms in response to the applied voltage. By propagating the deformation of the electrostriction section to the stress light-emitting material, the external force acts on the stress light-emitting material. This allows the stress light-emitting material to emit the light. That is, the light-emitting section can emit the light. Note that, the stress light-emitting material utilizes the nature in which the electrons excited by the mechanical energy carries out luminescence when the electrons thus excited move back toward the ground state. Moreover, when an AC voltage is applied to the electric inductive distortion material, the electric inductive distortion material vibrates in response to a frequency of the AC voltage thus applied. The stress light-emitting section may periodically emit the light in response to the periodical vibration.

Moreover, the electric inductive distortion material and the stress light-emitting material can be formed without using materials, which cause environmental problems, such as mercury which is used in a conventional fluorescent lamp. As such, the electric inductive distortion material and the stress light-emitting material will never cause any environmental problems. Moreover, the light-emitting device of the present invention has a two-section structure of the electrostriction section and the stress light-emitting section. Therefore, as compared with a conventional fluorescent character display tube, the light-emitting device of the present invention has a simpler and stronger structure, and is easily manufactured.

Furthermore, unlike the conventional incandescent lamp which emits the light based on the heat emission, the light-emitting device of the present invention emits the light by utilizing the nature in which the electrons excited by the mechanical energy carries out luminescence when the electrons thus excited move back toward the ground state. As such, the light-emitting device does not bring about the heat rise caused by the light emission. That is, the light-emitting device of the present invention can last long, have good luminous efficiency, and is compact and strong.

Therefore, it is possible to provide the light-emitting device, which is pollution-free, long-lasting, easy to produce, simple in structure, and strong.

For a fuller understanding of the nature and advantages of the invention, reference should be made to the ensuing detailed description taken in conjunction with the accompanying drawings.

BEST MODE FOR CARRYING OUT THE INVENTION

[First Embodiment]

The following description deals with one embodiment of the present invention with reference to FIGS. 1 through 4.

Figure 1:
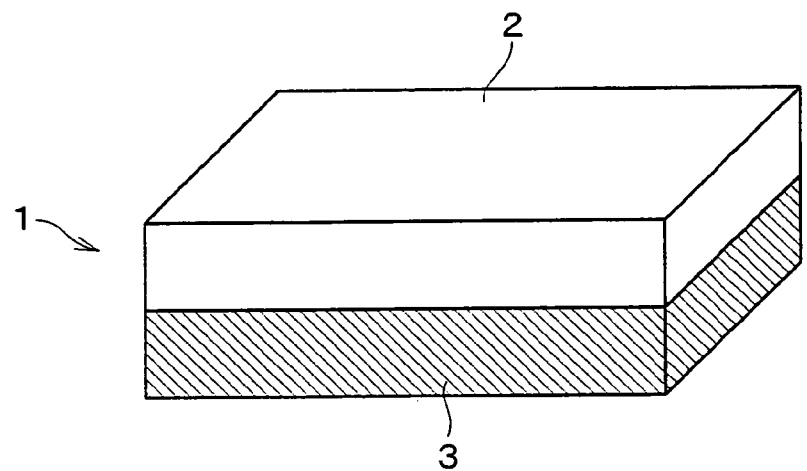
FIG. 1 is an oblique perspective view showing a stacked structure of a light-emitting device in accordance with one embodiment of the present invention.

As shown in FIG. 1, a stacked structure (light-emitting device) 1 in accordance with one embodiment of the present invention includes an electrostriction layer (electrostriction section) 2 and a stress light-emitting layer (stress light-emitting section) 3.

The electrostriction layer 2 includes an electric inductive distortion material whose crystals strain in response to an applied voltage. The electrostriction layer 2 has a thickness of about 11 m to 10 mm. Moreover, it is possible to use, as the electric inductive distortion material, (i) an electrostriction ceramics material represented by 0.9 MN-0.1PT ([Pb(Mg$_{1/3}$Nb$_{2/3}$)$_{0.9}$Ti$_{0.1}$]O$_3$), (ii) a piezoelectric ceramics material represented by PZT (Product Name: provided by Clevite Corp. (U.S.), (iii) a piezoelectric thin film vibrator material represented by ZnO, or (iv) a high-polymer piezoelectric material represented by a high-polymer material (polymer) or polyvinylidene fluoride (PVDF).

Pb(Mg$_{1/3}$Nb$_{2/3}$)O$_3$, (Pb, Ba)(Zr, Ti)O$_3$, or (Pb, La)(Zr, Ti)O$_3$ can be used as the electrostriction ceramics material.

The piezoelectric ceramics material is indicated by a chemical formula ABO$_3$. Note that A and B are metallic elements, and each is composed of one, or two or more replaceable element(s). Concrete examples of the piezoelectric ceramics material are as follows.

Single-component type: BaTiO$_3$, PbTiO$_3$, crystal (SiO$_2$), LiNbO$_3$

Two-component type: PbTi$_{0.48}$Zr$_{0.52}$O$_3$

Three-component type: Pb(Mg$_{1/3}$Nb$_{2/3}$)O$_3$—PbTiO$_3$,
—PbZrO$_3$,
Pb(Sb$_{1/2}$Nb$_{2/3}$)O$_3$—PbTiO$_3$,
—PbZrO$_3$+MnO$_2$,
Pb(Mn$_{1/3}$Sb$_{2/3}$)O$_3$—PbTiO$_3$,
—PbZrO$_3$,
Pb(Co$_{1/3}$Nb$_{2/3}$)O$_3$—PbTiO$_3$,
—PbZrO$_3$ The piezoelectric thin film vibrator material is indicated by a chemical formula MX. Note that M shows one, or two or more replaceable metallic element(s), and X is any one of elements indicated by chemical symbols N, O, S, and C. For example, concrete examples of the piezoelectric thin film vibrator material are a ZnO film, a CdS film, and an AlN film.

It is possible to use, as the high-polymer piezoelectric material, (i) an electret in which electric charges of positive and negative polarities permanently appear respectively on both surfaces of a high-polymer film which is not subject to drawing process, and (ii) a piezoelectric film in which a polarization operation is carried out, under high temperature and high electric field, with respect to a high-polymer film which has been subject to the drawing process. Further concrete examples of the high-polymer piezoelectric material are polyvinylidene fluoride (PVDF), polyvinyl fluoride (PVF), and copolymer of vinylidene cyanide and vinyl acetate (P(VDCN/VAC)).

Note that, in the case where the electrostriction layer 2 deforms in response to an applied voltage, it is possible to select one from two types of combinations of the electrode and the electric inductive distortion material, i.e., a simple deformation type or a flexure deformation type. The simple deformation type is exemplified by mooney type, cymbal type, or ultrasonic motor type. The flexure deformation type is exemplified by monomorph, unimorph, or bimorph.

The stress light-emitting layer 3 includes a stress light-emitting material which emits light in response to an applied mechanical energy such as stress, vibration, friction, or the like. The stress light-emitting layer 3 has a thickness of about 0.01 μm to 1 mm. More specifically, the stress light-emitting material includes, in an inorganic host material, at least one kind of metal ion as a luminescent center ion of the luminescence center. The metal ion indicates at least one kind of metal ion of rare earth metal and transition metal which emit the light when electrons excited by the mechanical energy move back toward the ground state.

As the inorganic host material, oxide, sulfide, nitride, and carbide may be used. A material indicated by the chemical formula $xMO$, $yQ_2O_3$, or $zGO_2$ is preferable as the oxide (M is Sr, Mg, Ba, or Zn; Q is Al, Ga, Y, or In; G is Ti, Zr, Si, or Sn). Note that, each of M, Q, and G can be partially replaced with at least one kind of metal ion. Note also that each of x, y, and z is an integer such as 0, 1, 2, 3, or the like.

Moreover, concrete examples of sulfide as the inorganic host material are $ZnS$, $CdS$, $MnS$, $MoS_3$, and $MnS_2$. Concrete examples of nitride as the inorganic host material are AlN, GaN, InN, TaN, and the like, and concrete examples of carbide are SiC, TiC, BC, and the like. Especially, aluminate or zinc sulfide is preferable as the inorganic host material.

It is preferable that a host material of the stress light-emitting material is a material (i) which is composed of at least one kind of aluminate having a non-stoichiometric composition, and (ii) which has lattice defect that causes electrons excited by the mechanical energy to carry out luminescence when the electrons thus excited move back toward the ground state. Furthermore, the above host material may include, as the luminescent center ion of the luminescence center, at least one kind of metal ion selected from the rare earth metal ion and the transition metal ion. Note that, the non-stoichiometric composition indicates a composition having a chemical composition formula which departs from a stoichiometric chemical composition formula.

The rare earth metal ion selected as the luminescent center ion of the luminescence center is exemplified by Sc, Y, La, Ce, Pr, Nd, Pm, Sm, Eu, Gd, Tb, Dy, Ho, Er, Tm, Yb, Lu, or the like. The transition metal ion selected as the luminescent center ion of the luminescence center is exemplified by Ti, Zr, V, Cr, Mn, Fe, Co, Ni, Cu, Zn, Nb, Mo, Ta, W, or the like.

By thus including the luminescent center ion of the luminescence center in the host material, it is possible to further increase a luminescence intensity of the stress light-emitting layer 3. Especially, in the case where the host material is $SrAl_2O_4$, and when Sm, Eu, Gd, Tb, Dy or the like is included in the luminescent center ion of the luminescence center, it is possible for the stress light-emitting layer 3 to emit the light with strong luminescence intensity upon receipt of the stress.

Furthermore, it is preferable that the stress light-emitting layer 3 be prepared with the use of strontium aluminate as the stress light-emitting material. Strontium aluminate also functions as the electric inductive distortion material. As such, it is possible to utilize strontium aluminate when forming the electrostriction layer 2. That is, it is possible for the electrostriction layer 2 and the stress light-emitting layer 3 to be made of a single material. This allows the simplification of the manufacturing steps of the stacked structure 1. It is also possible to reduce the cost for manufacturing the stacked structure 1.

Moreover, the stacking of the electrostriction layer 2 and the stress light-emitting layer 3 is carried out by PVD (Physical Vapor Deposition), sputtering, evaporating, ion plating, or ion mixing. Further, CVD (Chemical Vapor Deposition), electrophoresis, coating pyrolysis, spraying, or tape-casting may be used to stack the electrostriction layer 2 and the stress light-emitting layer 3. Furthermore, the stacking of the electrostriction layer 2 and the stress light-emitting layer 3 may be carried out, by applying the stress light-emitting layer 3, with which an adhesive is mixed, onto the electrostriction layer 2.

With the arrangement, when applying a voltage to the electrostriction layer 2 in the stacked structure 1 of the present embodiment, the electric inductive distortion material deforms, so that the electrostriction layer 2 also deforms. The deformation of the electrostriction layer 2 causes an external force to act on the stress light-emitting material of the stress light-emitting layer 3, thereby resulting in that the stress light-emitting layer 3 emits the light. That is, the applying of a voltage to the stacked structure 1 allows the stacked structure 1 to emit the light.

Note that, when the electrostriction layer 2 repeatedly applies the stress to the stress light-emitting layer 3, it is also possible to make the stress light-emitting layer 3 flash on and off. Note that it is necessary for the stress applied by the electrostriction layer 2 to be much smaller than the stress of an elastic limit of the stress light-emitting layer 3. In concrete terms, it is preferable that the stress applied by the electrostriction layer 2 be 0.001% to 10% of the stress of the elastic limit of the stress light-emitting layer 3. With the stress, it is possible to avoid that any cracks or subsidiary fractures occur in the stress light-emitting layer 3, even if the stress is applied repeatedly.

Figure 2:
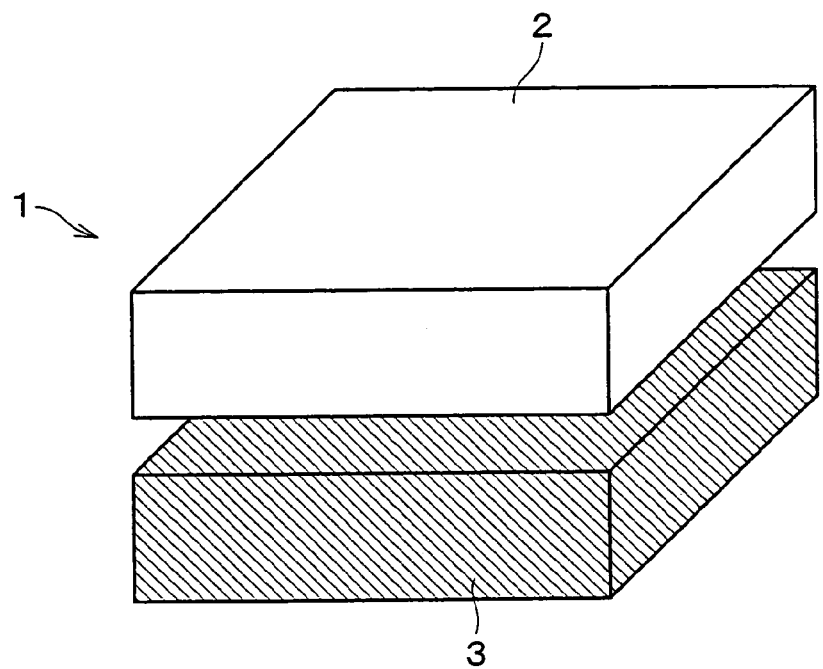
FIG. 2 is an oblique perspective view showing a state in which an electrostriction layer and a stress light-emitting layer in the stacked structure of FIG. 1 are separated from each other.

Note that it is not necessary that the indiscrete stacking of the electrostriction layer 2 and the stress light-emitting layer 3 is carried out. That is, the electrostriction layer 2 and the stress light-emitting layer 3 may be separated from each other as shown in FIG. 2. Note that it is necessary that a distance between the electrostriction layer 2 and the stress light-emitting layer 3 is shorter than the maximal value of a possible deformation quantity of the electrostriction layer 2.

In this case, when deforming the electrostriction layer 2 by applying a voltage, it is possible to instantaneously switch from a state in which the electrostriction layer 2 and the stress light-emitting layer 3 contact with each other to a state in which the electrostriction layer 2 and the stress light-emitting layer 3 do not contact with each other, or vice versa. That is, it is possible to instantaneously control lighting on/off of the stress light-emitting layer 3, by instantaneously switching from a state in which the stress light-emitting layer 3 emits the light to a state in which the stress light-emitting layer 3 does not emit the light, or vice versa.

Moreover, the stress light-emitting layer 3 may be formed by mixing a stress light-emitting material and a long phosphorescent phosphor. It should be noted that the long phosphorescent phosphors is a substance which stores incident light for a certain period of time. It is possible to use $SrAl_2O_4$: Eu, Dy, aluminate, silicate, or Dy as the long phosphorescent phosphor, for example.

When thus forming the stress light-emitting layer 3 by mixing the stress light-emitting material and the long phosphorescent phosphor, it is possible to adjust the luminous intensity and a luminance persistence time of the stress light-emitting layer 3.

Figure 3:
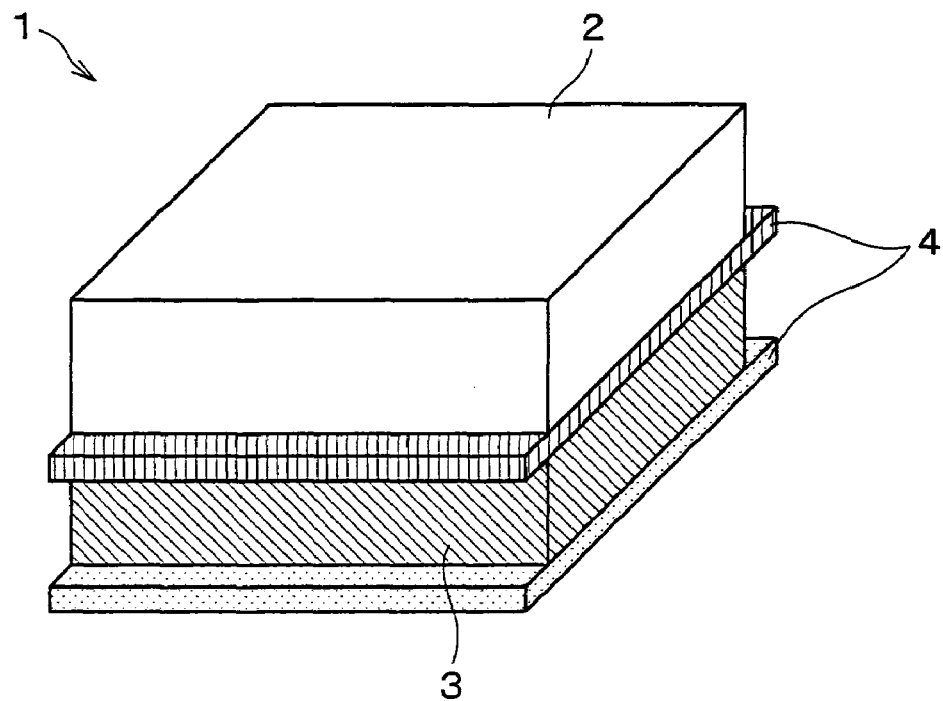
FIG. 3 is an oblique perspective view showing a state in which the stress light-emitting layer in the stacked structure of FIG. 1 is sandwiched between electrodes.

Furthermore, as shown in FIG. 3, the stress light-emitting layer 3 may be sandwiched between two electrodes 4 which are different from those (not shown) for applying a voltage to the electrostriction layer 2, while the stress light-emitting layer 3 is formed by mixing a stress light-emitting material and an electroluminescence material. Note that, the electroluminescence material is a material which carries out the luminescence in response to an applied electric field.

There are various kinds of organic electroluminescence materials and inorganic electroluminescence materials. The inorganic electroluminescence materials is exemplified by $ZnGa_2O_4$ family, $ZnS$ family, $MgGa_2O_4$ family, or the like.

With the arrangement, it is possible to adjust the luminous intensity of the electroluminescence material by adjusting the voltage applied to the electroluminescence material. This allows the adjustment of the luminous intensity of the stress light-emitting layer 3.

Figure 4:
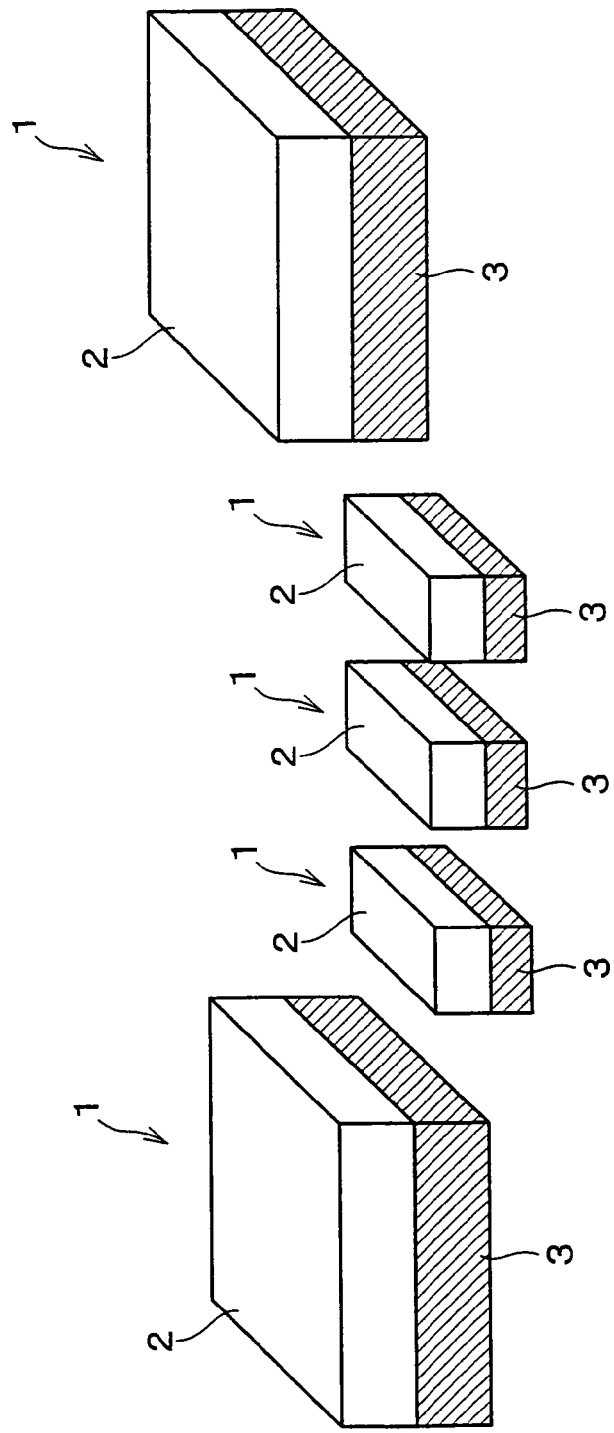
FIG. 4 is an oblique perspective view showing a state in which a plurality of the stacked structures of FIG. 1 are provided.

Moreover, as shown in FIG. 4, it may be possible to arrange a plurality of the stacked structures 1 which are different in size. That is, it is possible to arrange the stacked structures 1 so that a desired layout is realized. Thus, in accordance with various purposes of use (which will be described later) of the stacked structure 1, it is possible to arrange the stacked structures 1 with freely settable size, shape and/or layout.

Moreover, the stacked structure 1 can be used in various manners, which are explained below.

For example, it is possible to use the stacked structure 1 as the light-emitting device. The electrostriction layer 2 and the stress light-emitting layer 3 of the stacked structure 1 can be formed without using materials, such as mercury used in the conventional fluorescent lamp, causing environmental problems. Therefore, it is possible to use the stacked structure 1 as a light-emitting device causing no environmental problems.

Furthermore, the stacked structure 1 may be realized by a two-layer structure of the electrostriction layer 2 and the stress light-emitting layer 3. As such, it is possible for the stacked structure 1 to have a simpler and stronger structure, and to be easily fabricated, as compared with the conventional fluorescent character display tube having a complicated structure.

Moreover, unlike the conventional incandescent lamp which emits the light based on the heat radiation, the stacked structure 1 emits the light by utilizing a nature in which the electrons carry out the luminescence when the electrons excited by the mechanical energy move back toward the ground state. As such, the stacked structure 1 does not cause any heat rise. That is, the stacked structure 1 can be used as the light-emitting device which has a long life, good luminous efficiency, and compact and strong structure.

Moreover, the stacked structure 1 can be used as a display device in a display.

More specifically, a plurality of stacked structures 1, which respectively include color filters in which layers carrying out light emission of respective colors of R, G and B are alternately provided, are formed (i) so as to have the same size as or smaller than that of LEDs which are used for the full-color screen display, and (ii) so as to be arranged in a matrix manner. When changing the voltages to be applied to the stacked structures 1 having the above arrangement, it is possible to change external force applied to the stress light-emitting layers 3. That is, it is possible for each stacked structure to have a different luminous intensity and a different luminous color.

Therefore, it is possible to carry out the image display with the same screen size as the full-color screen using LEDs. Moreover, the stress light-emitting layer 3 of the stacked structure 1 carries out planar emission. Therefore, it is possible to improve the image quality more than the conventional full-color screen using LEDs which carry out the dot emission.

Moreover, when arranging the stacked structures 1 in a matrix manner as described above, no space, which is hermetically sealed under vacuum, is formed, unlike the glass tube of the conventional CRT display. As such, it is possible to realize weight saving, and to improve crashworthy and heat resistance.

Moreover, it may be possible to turn on the respective stacked structures 1 based on the same drive method (the simple matrix method, or the active matrix method) as that of the liquid crystal display, while using the stacked structures 1 as a light-emitting source (backlight) of the liquid crystal display. In this case, it is not necessary to use the fluorescent tube, which uses mercury causing environmental problems, as the light-emitting source. Moreover, the electrostriction layer 2 and the stress light-emitting layer 3 of the stacked structure 1 can be formed without using a material such as mercury causing environmental problems.

Therefore, when using the stacked structures 1 as the light-emitting source of the liquid crystal display, it is possible to carry out the image display, without causing any environmental problems, like the conventional liquid crystal display does.

Moreover, it is possible to use the stacked structure 1 as a stress sensor.

That is, in the case where the stacked structure 1 is provided on a wall surface or the like of an architectural structure which is a measuring object for the stress, the stress or vibration acted on the wall surface also acts on the stacked structure 1. Moreover, according to a luminescence characteristic, the greater the externally applied stress and vibration become, the stronger the luminous intensity of the stress light-emitting material in the stress light-emitting layer 3 becomes.

As such, when measuring such a luminous characteristic of the stress light-emitting layer 3 in advance, it is possible to visually recognize the stress acted on the wall surface based on the luminescence intensity of the stress light-emitting layer 3. In this way, it is possible to use the stacked structure 1 as the stress sensor.

Especially, the stress light-emitting layer 3 shows a distribution state of the luminous intensity which varies depending on a distribution state of the external force acted on the stress light-emitting layer 3. That is, in the case where the stacked structure 1 is used as the stress sensor, not only the stress acted on a specific point of the measuring object but also the distribution state of the stress acted on the measuring object can be visually recognized.

Moreover, the stacked structure 1 can be used as an embedded stress sensor. That is, the stacked structures 1 is embedded in the wall surface or the like of the measuring object such as bridges, tunnels, roads, or architectural structures. In the circumstances, when detecting the light, which is generated by the stress light-emitting layer 3, via an optical fiber, it is possible to recognize the external force acted on the measuring object.

[Second Embodiment]

Figure 5:
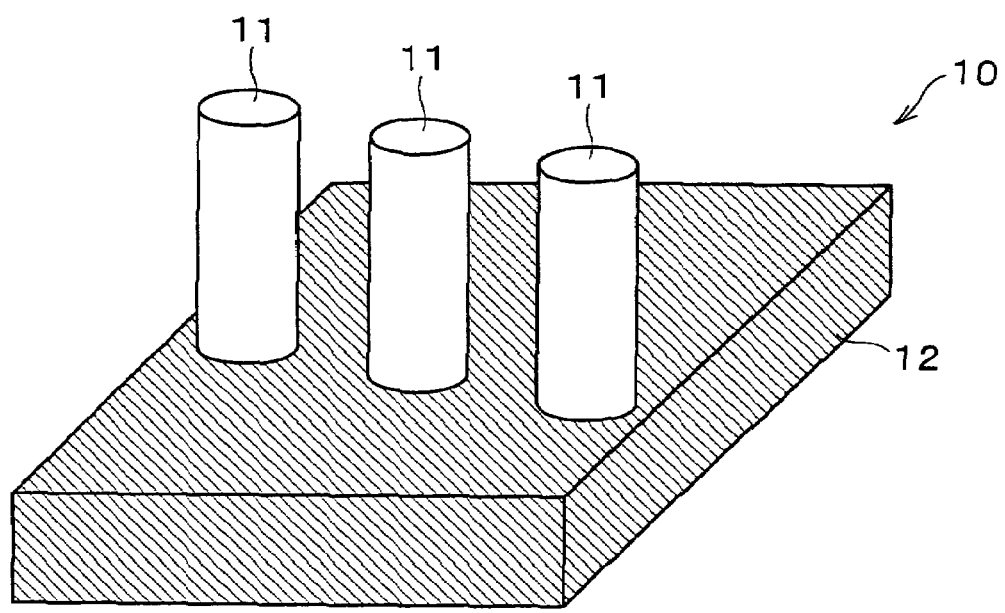
FIG. 5 is an oblique perspective view of a light-emitting device in accordance with another embodiment of the present invention.

The following description deals with another embodiment of the present invention with reference to FIG. 5. Note that, in order to simplify the explanation, members having the same functions as those shown in the figures of the First Embodiment are denoted by the same reference numerals and are not described repeatedly. Moreover, like the First Embodiment, the present embodiment can combine various kinds of features described in the First Embodiment.

As shown in FIG. 5, a light-emitting device 10 of the present embodiment includes a plurality of electrostriction sticks (electrostriction section) 11 and a stress light-emitting layer (stress light-emitting section) 12.

Like the electrostriction layer 2 of the First Embodiment, each electrostriction stick 11 includes an electric inductive distortion material whose crystals strain in response to an applied voltage. The electrostriction sticks 11 are respectively formed so as to have a cylindrical shape, and are arranged on the stress light-emitting layer 12.

Like the stress light-emitting layer 3 of the First Embodiment, the stress light-emitting layer 12 includes a stress light-emitting material, which emits the light in response to applied external force. The stress light-emitting layer 12 has a thickness of about 0.0 μm to 1 mm.

With the above arrangement, when a voltage is applied to the electrostriction sticks 11 in the light-emitting device 10 of the present embodiment, the electrostriction sticks 11 deform. The deformation of the electrostriction sticks 11 causes the external force to act on the stress light-emitting layer 12. This allows the stress light-emitting layer 12 to carry out the luminescence. Namely, the applying of the voltage to the light-emitting device 10 allows the light-emitting device 10 to emit the light.

Moreover, by applying a voltage to any one of the electrostriction sticks 11, it is possible to apply the external force to part of the stress light-emitting layer 12. This allows a desired part of the stress light-emitting layer 12 to emit the light.

EXAMPLE

The following description deals with a verified characteristic of the luminescence intensity of the stacked structure 1 in accordance with the First Embodiment of the present invention. Here, PMN ($PbMgNbO_3$), which is aligned by the sputtering, is used as the electric inductive distortion material in the electrostriction layer 2, and strontium aluminate is used as the stress light-emitting material in the stress light-emitting layer 3.

Figure 6:
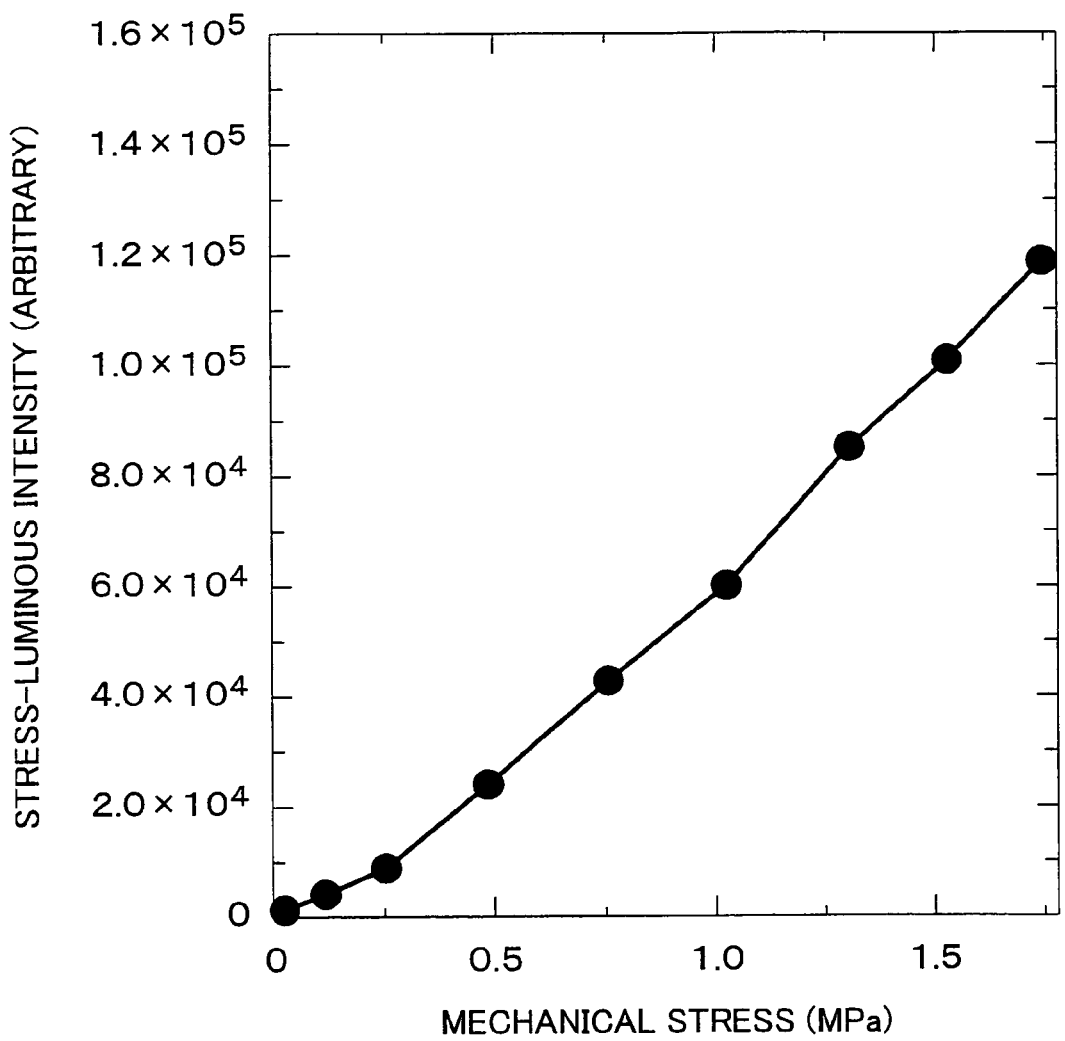
FIG. 6 is a graph showing a relationship between a mechanical stress and a stress-luminous intensity in the stacked structure of FIG. 1.

FIG. 6 is a graph showing a relationship, in the stacked structure 1 of the above structure, between the stress applied to the stress light-emitting layer 3 and the luminous intensity. As shown in FIG. 6, it was clear that the luminous intensity depended on the stress, and that the luminescence intensity increased with an increase in the stress.

Figure 7:
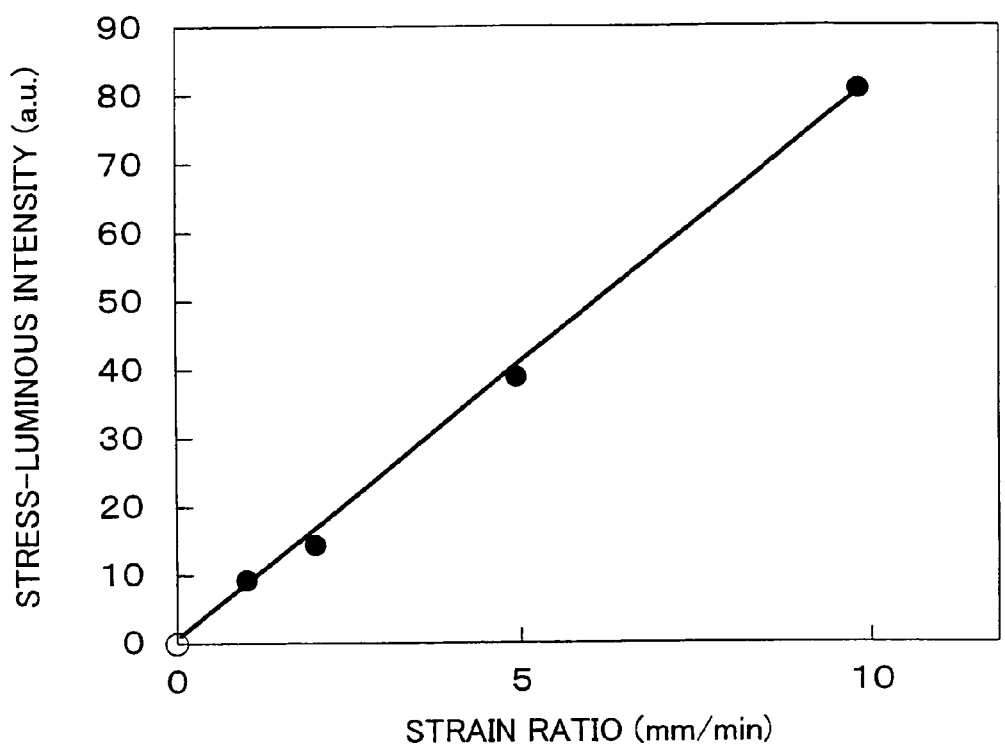
FIG. 7 is a graph showing a relationship between a strain ratio and the stress-luminous intensity in the stacked structure of FIG. 1.

Moreover, FIG. 7 is a graph showing a relationship between a strain ratio of the electrostriction layer 2 and the luminous intensity. As shown in FIG. 7, it was clear that the luminous intensity depended on the strain ratio, and that the luminous intensity increased with an increase in the strain ratio.

As described above, a light-emitting device of the present invention includes the electrostriction portion includes (i) an electrostriction section including an electric inductive distortion material which deforms in response to an applied voltage, and (ii) a stress light-emitting section including a stress light-emitting material which emits light in response to applied external force.

With the arrangement, the electric inductive distortion material and the stress light-emitting material can be formed without using materials, which cause the environmental problems, such as mercury which is used in the conventional fluorescent tube. Furthermore, unlike the conventional incandescent lamp, the light-emitting device of the present invention is not arranged so as to emit the light based on the heat emission. The light-emitting device of the present invention emits the light by utilizing a nature in which the electrons carry out the luminescence when the electrons excited by the mechanical energy move back toward the ground state. As such, the light-emitting device does not bring about the heat rise caused by the light emission.

Therefore, it is possible to provide the light-emitting device which is pollution-free, long-lasting, easy to produce, simple in structure, and strong.

Moreover, the light-emitting device of the present invention, in the light-emitting device having the above structure, may be arranged so that the electrostriction section and the stress light-emitting section are stacked.

With the arrangement, it is possible to surely transmit the deformation of the electrostriction section to the stress light-emitting section, and it is also possible to reduce the size of the light-emitting device. As such, when the light-emitting device is incorporated into other devices, it is easy to layout the light-emitting devices, and it is possible to save spaces.

Alternatively, the light-emitting device of the present invention, in the light-emitting device of the above structure, may be arranged so that the electrostriction section and the stress light-emitting section are separated from each other.

With the above arrangement, when the electrostriction section deforms in response to an applied voltage, it is possible to instantaneously change from a state in which the electrostriction section and the stress light-emitting section contact with each other to a state in which the electrostriction section and the stress light-emitting section do not contact with each other, or vice versa. That is, it is possible to instantaneously change from a state in which the stress light-emitting section emits the light to a state in which the stress light-emitting section does not emit the light, or vice versa. As such, it is possible to instantaneously control lighting on/off of the light-emitting device.

Alternatively, the light-emitting device of the present invention, in the light-emitting device of the above structure, may be arranged so that the stress light-emitting section is formed by mixing the stress light-emitting material and the long phosphorescent phosphor.

With the arrangement, the light emitted by the stress light-emitting material is temporarily stored by the long phosphorescent phosphor for a predetermined period of time. It should be noted that the long phosphorescent phosphor is a substance which can store the received light for a predetermined period of time.

Therefore, it is possible to adjust the luminescence intensity and the luminance persistence time of the stress light-emitting section.

Alternatively, the light-emitting device of the present invention, in the light-emitting device of the above structure, may be arranged so that the stress light-emitting section is formed by mixing the stress light-emitting material and the electroluminescence material, and is sandwiched between electrodes which are different from electrodes for applying a voltage to the electrostriction section.

With the arrangement, it is possible to adjust the luminescence intensity of the electroluminescence material by adjusting the voltage applied to the electroluminescence material. Note that the electroluminescence material is a material which emits the light in response to an applied electric field. In this way, it is possible to adjust the luminescence intensity of the stress light-emitting section.

Alternatively, the light-emitting device of the present invention, in the light-emitting device of the above structure, may be arranged so that the electric inductive distortion material and the stress light-emitting material are mixed. With the arrangement, it is possible to integrally form the electrostriction portion and the stress light-emitting portion. As such, it is possible to further downsize the light-emitting device.

Moreover, the display device of the present invention is arranged so as to use any one of the light-emitting devices having the above respective structures.

With the arrangement, by forming the stress light-emitting section of the light-emitting device in a plan shape for example, it is possible for the light-emitting device of the present invention to emit the planar light. As such, it is possible to improve the image quality more than the conventional full-color screen using LEDs which carry out the dot emitting lights.

Moreover, it is possible to form an image display surface by continuously providing the stress light-emitting sections. Therefore, unlike the glass tube of the CRT display, it is not necessary to secure a large space, which is hermetically sealed under vacuum, for the image display. As such, it is possible to improve the crashworthy and the heat resistance.

Furthermore, the electric inductive distortion material and the stress light-emitting material in the light-emitting device of the present invention can be formed without using materials, which cause the environmental problems, such as mercury used in a light source of the conventional plasma display and the liquid crystal display.

Therefore, it is possible to carry out the image display without causing any environmental problems.

The stress sensor of the present invention is arranged so as to use any one of the light-emitting devices of the above respective structures.

With the arrangement, it is possible to visually recognize the stress acted on the measuring object and the change ratio of the stress. Especially, the stress light-emitting section shows the distribution state of the luminous intensity which varies depending on the distribution state of the external force acted on the stress light-emitting section and the vibration.

As such, not only the stress acted on a specific point of the measuring object but also the distribution state of the stress acted on the measuring object can be visually recognized.

Industrial Applicability

As described above, the light-emitting device of the present invention is pollution-free, long-lasting, easy to produce, and is suitably used as a display device or a stress sensor.

The invention claimed is:

1. A light-emitting device, comprising:
an electrostriction section including an electrostriction ceramics material as an electric inductive distortion material which deforms in response to an applied voltage, and
a stress light-emitting section including a stress light-emitting material which emits light in response to applied external force,
wherein the stress light-emitting section is formed by mixing the stress light-emitting material and a long phosphorescent phosphor, and the long phosphorescent phosphor is $SrAl_2O_4$:Eu, aluminate, or silicate, and
wherein the electric inductive distortion material and the stress light-emitting material are mixed.

2. A display device comprising the light-emitting device as set forth in claim 1.

3. A stress sensor comprising the light-emitting device as set forth in claim 1, the light-emitting device indicating a luminous intensity which varies depending on a strain ratio.

4. A light-emitting device, comprising:
an electrostriction section including an electric inductive distortion material which deforms in response to an applied voltage, and
a stress light-emitting section including a stress light-emitting material which emits light in response to applied external force,
wherein the stress light-emitting section is formed by mixing the stress light-emitting material and a long phosphorescent phosphor, and the long phosphorescent phosphor is $SrAl_2O_4$:Eu, aluminate, or silicate, and
wherein the electric inductive distortion material and the stress light-emitting material are mixed.

5. A display device comprising the light-emitting device as set forth in claim 4.

6. A stress sensor comprising the light-emitting device as set forth in claim 4, the light-emitting device indicating a luminous intensity which varies depending on a strain ratio.

7. A light-emitting device, comprising:
an electrostriction section including an electric inductive distortion material which deforms in response to an applied voltage, and
a stress light-emitting section including a stress light-emitting material which emits light in response to applied external force,
wherein the electric inductive distortion material and the stress light-emitting material are mixed.

8. A display device comprising the light-emitting device as set forth in claim 7.

9. A stress sensor comprising the light-emitting device as set forth in claim 7, the light-emitting device indicating a luminous intensity which varies depending on a strain ratio.

* * * * *